United States Patent [19]
Hauck et al.

[11] Patent Number: 5,878,061
[45] Date of Patent: Mar. 2, 1999

[54] PROVIDING SERIAL DATA CLOCK SIGNAL TRANSITIONS WITH PARITY BITS

[75] Inventors: Jerry V. Hauck, Fremont; Eric Cabot Hannah, Pebble Beach, both of Calif.

[73] Assignee: Intel Corporation, Santa Clara, Calif.

[21] Appl. No.: 948,390

[22] Filed: Oct. 10, 1997

Related U.S. Application Data

[63] Continuation of Ser. No. 615,737, Mar. 14, 1996, abandoned.

[51] Int. Cl.⁶ ..................................... G06F 11/00
[52] U.S. Cl. .................. 371/49.1; 371/37.7; 395/185.05
[58] Field of Search .................... 371/49.1, 49.2, 371/48, 37.2, 37.1, 37.7, 35, 20.1, 30, 37.01, 37.6; 395/185.01, 185.02, 185.05, 185.09; 364/944.5, 265, 265.1, 265.2, 266.3, 945.6

[56] References Cited

U.S. PATENT DOCUMENTS

| | | | |
|---|---|---|---|
| 3,567,916 | 3/1971 | Fallton, Jr. ............................ | 371/49.4 |
| 3,889,236 | 6/1975 | Herger et al. ......................... | 371/49.1 |
| 4,291,408 | 9/1981 | Ogawa et al. ......................... | 371/49.1 |
| 4,530,095 | 7/1985 | Ryan ..................................... | 371/49.2 |
| 4,700,358 | 10/1987 | Duncanson et al. ................... | 371/49 |
| 4,958,350 | 9/1990 | Worley, III et al. .................. | 371/37.4 |
| 5,040,179 | 8/1991 | Chen ..................................... | 371/37.1 |
| 5,056,089 | 10/1991 | Furuta et al. ......................... | 371/21.1 |
| 5,369,650 | 11/1994 | Kirk et al. ............................. | 371/40.1 |
| 5,563,894 | 10/1996 | Fujiwara et al. ...................... | 371/37.1 |

OTHER PUBLICATIONS

Transmission Code For High–Speed Fibre–Optic Data Networks, by A.X. Widmer & P.A. Franaszek, Electronic Letters, 17th Mar. 1983, vol. 19, No. 6, pp. 202–203.

A DC–Balanced, Partitioned–Block, 8B/10B Transmission Code, by A.X. Widmer & P.A. Franaszek, IBM J. Res. Develop., Sep. 198 vol. 27, No. 5, pp. 440–451.

*Primary Examiner*—Trinh L. Tu
*Attorney, Agent, or Firm*—William H. Murray; N. Stephan Kinsella

[57] ABSTRACT

A word of data bits is received and a plurality of parity bits for serial transmission of the data bits is generated. The word of data bits and plurality of parity bits are transmitted, wherein the parity bits are generated and transmitted with the data bits, wherein the parity bits are generated in accordance with a parity scheme that ensures that at least one binary transition occurs within each set of n consecutively transmitted bits, wherein n is a specified number. In another embodiment, a serially-transmitted code word comprising a word of data bits and a plurality of parity bits is received, wherein the parity bits are generated by an encoder and transmitted with the data bits, wherein the parity bits are generated in accordance with a parity scheme that ensures that at least one binary transition occurs within each set of n consecutively transmitted bits, wherein n is a specified number. A parity bit syndrome is generated from the code word, and data correction or detection is performed on the code word in accordance with the parity bit syndrome.

55 Claims, 8 Drawing Sheets

FIG. 2
200

SUB-WORD 0 | SUB-WORD 1 | SUB-WORD 2 | SUB-WORD 3
$P_0 P_1$ - 10 BITS OF DATA | $P_2 P_3$ - 10 BITS OF DATA | $P_4 P_5$ - 10 BITS OF DATA | $P_6 P_7$ - 10 BITS OF DATA

FIG. 3
300

SUB-WORD 0 | SUB-WORD 1 | SUB-WORD 2 | SUB-WORD 3 | SUB-WORD 4
$P_0 P_1$ - 8 BITS OF DATA | $P_2 P_3$ - 8 BITS OF DATA | $P_4 P_5$ - 8 BITS OF DATA | $P_6 P_7$ - 8 BITS OF DATA | $P_8 P_9$ BITS OF DATA

PARITY MATRIX STRUCTURE

600

|  | $(P_0 P_1)$ | $(P_2 P_3)$ | $(P_4 P_5)$ | $(P_6 P_7)$ | $(P_8)$ |
|---|---|---|---|---|---|
| SUB-WORD 0 | 01/10 | 11/00 | 11/00 | 11/00 | 0 |
| SUB-WORD 1 | 11/00 | 01/10 | 11/00 | 11/00 | 0 |
| SUB-WORD 2 | 11/00 | 11/00 | 01/10 | 11/00 | 0 |
| SUB-WORD 3 | 11/00 | 11/00 | 11/00 | 01/10 | 0 |
| SUB-WORD 4 | 11/00 | 11/00 | 11/00 | 11/00 | 1 |

EACH ROW HAS AN ODD NUMBER OF 1's

|    | P7 | P6 | P5 | P4 | P3 | P2 | P1 | P0 |
|----|----|----|----|----|----|----|----|-----|
| 0  | 0 | 0 | 0 | 0 | 0 | 0 | 0 | 1 |
| 1  | 0 | 0 | 0 | 0 | 0 | 0 | 1 | 0 |
| 2  | 0 | 0 | 0 | 0 | 1 | 1 | 0 | 1 |
| 3  | 0 | 0 | 0 | 0 | 1 | 1 | 1 | 0 |
| 4  | 0 | 0 | 1 | 1 | 0 | 0 | 0 | 1 |
| 5  | 0 | 0 | 1 | 1 | 0 | 0 | 1 | 0 |
| 6  | 0 | 0 | 1 | 1 | 1 | 1 | 0 | 1 |
| 7  | 0 | 0 | 1 | 1 | 1 | 1 | 1 | 0 |
| 8  | 1 | 1 | 0 | 0 | 0 | 0 | 0 | 1 |
| 9  | 1 | 1 | 0 | 0 | 0 | 0 | 1 | 0 |
| 10 | 1 | 1 | 0 | 0 | 1 | 1 | 0 | 1 |
| 11 | 1 | 1 | 0 | 0 | 1 | 1 | 1 | 0 |
| 12 | 0 | 0 | 0 | 0 | 0 | 1 | 0 | 0 |
| 13 | 0 | 0 | 0 | 0 | 1 | 0 | 0 | 0 |
| 14 | 0 | 0 | 1 | 1 | 0 | 1 | 0 | 0 |
| 15 | 0 | 0 | 1 | 1 | 1 | 0 | 0 | 0 |
| 16 | 1 | 1 | 0 | 0 | 0 | 1 | 0 | 0 |
| 17 | 1 | 1 | 0 | 0 | 1 | 0 | 0 | 0 |
| 18 | 1 | 1 | 1 | 1 | 0 | 1 | 0 | 0 |
| 19 | 1 | 1 | 1 | 1 | 1 | 0 | 0 | 0 |
| 20 | 0 | 0 | 0 | 0 | 0 | 1 | 1 | 1 |
| 21 | 0 | 0 | 0 | 0 | 1 | 0 | 1 | 1 |
| 22 | 0 | 0 | 1 | 1 | 0 | 1 | 1 | 1 |
| 23 | 0 | 0 | 1 | 1 | 1 | 0 | 1 | 1 |
| 24 | 0 | 0 | 0 | 1 | 0 | 0 | 0 | 0 |
| 25 | 0 | 0 | 1 | 0 | 0 | 0 | 0 | 0 |
| 26 | 1 | 1 | 0 | 1 | 0 | 0 | 0 | 0 |
| 27 | 1 | 1 | 1 | 0 | 0 | 0 | 0 | 0 |
| 28 | 0 | 0 | 0 | 1 | 0 | 0 | 1 | 1 |
| 29 | 0 | 0 | 1 | 0 | 0 | 0 | 1 | 1 |
| 30 | 1 | 1 | 0 | 1 | 0 | 0 | 1 | 1 |
| 31 | 1 | 1 | 1 | 0 | 0 | 0 | 1 | 1 |
| 32 | 0 | 0 | 0 | 1 | 1 | 1 | 0 | 0 |
| 33 | 0 | 0 | 1 | 0 | 1 | 1 | 0 | 0 |
| 34 | 1 | 1 | 0 | 1 | 1 | 1 | 0 | 0 |
| 35 | 1 | 1 | 1 | 0 | 1 | 1 | 0 | 0 |
| 36 | 0 | 1 | 0 | 0 | 0 | 0 | 0 | 0 |
| 37 | 1 | 0 | 0 | 0 | 0 | 0 | 0 | 0 |
| 38 | 0 | 1 | 0 | 0 | 0 | 0 | 1 | 1 |
| 39 | 1 | 0 | 0 | 0 | 0 | 0 | 1 | 1 |
| 40 | 0 | 1 | 0 | 0 | 1 | 1 | 0 | 0 |
| 41 | 1 | 0 | 0 | 0 | 1 | 1 | 0 | 0 |
| 42 | 0 | 1 | 0 | 0 | 1 | 1 | 1 | 1 |
| 43 | 1 | 0 | 0 | 0 | 1 | 1 | 1 | 1 |
| 44 | 0 | 1 | 1 | 1 | 0 | 0 | 0 | 0 |
| 45 | 1 | 0 | 1 | 1 | 0 | 0 | 0 | 0 |
| 46 | 0 | 1 | 1 | 1 | 0 | 0 | 1 | 1 |
| 47 | 1 | 0 | 1 | 1 | 0 | 0 | 1 | 1 |

| | P8 | P7 | P6 | P5 | P4 | P3 | P2 | P1 | P0 |
|---|---|---|---|---|---|---|---|---|---|
| 0 | 0 | 0 | 0 | 0 | 0 | 0 | 0 | 0 | 1 |
| 1 | 0 | 0 | 0 | 0 | 0 | 0 | 0 | 1 | 0 |
| 2 | 0 | 0 | 0 | 0 | 0 | 1 | 1 | 0 | 1 |
| 3 | 0 | 0 | 0 | 0 | 0 | 1 | 1 | 1 | 0 |
| 4 | 0 | 0 | 0 | 1 | 1 | 0 | 0 | 0 | 1 |
| 5 | 0 | 0 | 0 | 1 | 1 | 0 | 0 | 1 | 0 |
| 6 | 0 | 0 | 0 | 1 | 1 | 1 | 1 | 0 | 1 |
| 7 | 0 | 0 | 0 | 1 | 1 | 1 | 1 | 1 | 0 |
| 8 | 0 | 1 | 1 | 0 | 0 | 0 | 0 | 0 | 1 |
| 9 | 0 | 1 | 1 | 0 | 0 | 0 | 0 | 1 | 0 |
| 10 | 0 | 0 | 0 | 0 | 0 | 0 | 1 | 0 | 0 |
| 11 | 0 | 0 | 0 | 0 | 0 | 1 | 0 | 0 | 0 |
| 12 | 0 | 0 | 0 | 1 | 1 | 0 | 1 | 0 | 0 |
| 13 | 0 | 0 | 0 | 1 | 1 | 1 | 0 | 0 | 0 |
| 14 | 0 | 1 | 1 | 0 | 0 | 0 | 1 | 0 | 0 |
| 15 | 0 | 1 | 1 | 0 | 0 | 1 | 0 | 0 | 0 |
| 16 | 0 | 1 | 1 | 1 | 1 | 0 | 1 | 0 | 0 |
| 17 | 0 | 1 | 1 | 1 | 1 | 1 | 0 | 0 | 0 |
| 18 | 0 | 0 | 0 | 0 | 0 | 0 | 1 | 1 | 1 |
| 19 | 0 | 0 | 0 | 0 | 0 | 1 | 0 | 1 | 1 |
| 20 | 0 | 0 | 0 | 0 | 1 | 0 | 0 | 0 | 0 |
| 21 | 0 | 0 | 0 | 1 | 0 | 0 | 0 | 0 | 0 |
| 22 | 0 | 1 | 1 | 0 | 1 | 0 | 0 | 0 | 0 |
| 23 | 0 | 1 | 1 | 1 | 0 | 0 | 0 | 0 | 0 |
| 24 | 0 | 0 | 0 | 0 | 1 | 0 | 0 | 1 | 1 |
| 25 | 0 | 0 | 0 | 1 | 0 | 0 | 0 | 1 | 1 |
| 26 | 0 | 1 | 1 | 0 | 1 | 0 | 0 | 1 | 1 |
| 27 | 0 | 1 | 1 | 1 | 0 | 0 | 0 | 1 | 1 |
| 28 | 0 | 0 | 0 | 0 | 1 | 1 | 1 | 0 | 0 |
| 29 | 0 | 0 | 0 | 1 | 0 | 1 | 1 | 0 | 0 |
| 30 | 0 | 0 | 1 | 0 | 0 | 0 | 0 | 0 | 0 |
| 31 | 0 | 1 | 0 | 0 | 0 | 0 | 0 | 0 | 0 |
| 32 | 0 | 0 | 1 | 0 | 0 | 0 | 0 | 1 | 1 |
| 33 | 0 | 1 | 0 | 0 | 0 | 0 | 0 | 1 | 1 |
| 34 | 0 | 0 | 1 | 0 | 0 | 1 | 1 | 0 | 0 |
| 35 | 0 | 1 | 0 | 0 | 0 | 1 | 1 | 0 | 0 |
| 36 | 0 | 0 | 1 | 0 | 0 | 1 | 1 | 1 | 1 |
| 37 | 0 | 1 | 0 | 0 | 0 | 1 | 1 | 1 | 1 |
| 38 | 0 | 0 | 1 | 1 | 1 | 0 | 0 | 0 | 0 |
| 39 | 0 | 1 | 0 | 1 | 1 | 0 | 0 | 0 | 0 |
| 40 | 1 | 0 | 0 | 0 | 0 | 0 | 0 | 0 | 0 |
| 41 | 1 | 0 | 0 | 0 | 0 | 0 | 0 | 1 | 1 |
| 42 | 1 | 0 | 0 | 0 | 0 | 1 | 1 | 0 | 0 |
| 43 | 1 | 0 | 0 | 0 | 0 | 1 | 1 | 1 | 1 |
| 44 | 1 | 0 | 0 | 1 | 1 | 0 | 0 | 0 | 0 |
| 45 | 1 | 0 | 0 | 1 | 1 | 0 | 0 | 1 | 1 |
| 46 | 1 | 0 | 0 | 1 | 1 | 1 | 1 | 0 | 0 |
| 47 | 1 | 0 | 0 | 1 | 1 | 1 | 1 | 1 | 1 |
| 48 | 1 | 1 | 1 | 0 | 0 | 0 | 0 | 0 | 0 |
| 49 | 1 | 1 | 1 | 0 | 0 | 0 | 0 | 1 | 1 |

FIG. 8

PROVIDING SERIAL DATA CLOCK SIGNAL TRANSITIONS WITH PARITY BITS

This is a Continuation of application Ser. No. 08/615,737, filed Mar. 14, 1996, now abandoned.

BACKGROUND OF THE INVENTION

1. Field of the Invention

The present invention relates to serial data communication.

2. Description of the Related Art

In serial data communication, there is a need for providing embedded clock signals, sometimes referred to as AC (alternating current) transitions. An encoder typically serializes data bits for serial transmission to a receiver having a decoder. By recognizing occasional AC transitions between binary 0s and 1s in the received serial bitstream, the decoder can synchronize its clock so that it samples the received bitstream properly. These AC transitions should occur frequently enough so that the decoder can synchronize properly, i.e. so that the encoder's clock signal is sufficiently embedded in the serial bitstream.

To ensure that a long run of 0s or 1s does not occur that would cause the decoder to become unsynchronized, the encoder should ensure that enough AC transitions occur often enough in the serial bitstream so that the decoder can detect the clock signal at which the bitstream is encoded and accurately sample and decode the serial bitstream data. One solution is to insert a special transition bit every n bits, e.g. every 10th bit, which is the inverse of the preceding bit, to ensure that there are always AC transitions often enough to embed the clock signal. Unfortunately, this technique is inefficient since 1/n of the bitstream is used to provide a clock signal rather than information. There is, therefore, a need for improved methods for providing for AC transitions in serial bitstreams.

SUMMARY

There is provided herein a method, apparatus, and storage medium for encoding data for serial transmission. According to one embodiment, a word of data bits is received, and a plurality of parity bits for serial transmission of the data bits is generated. The word of data bits and plurality of parity bits are transmitted, wherein the parity bits are generated and transmitted with the data bits, wherein the parity bits are generated in accordance with a parity scheme that ensures that at least one binary transition occurs within each set of n consecutively transmitted bits, wherein n is a specified number.

There is also provided herein a method, apparatus, and storage medium for decoding data. According to one embodiment, a serially-transmitted code word comprising a word of data bits and a plurality of parity bits is received, wherein the parity bits are generated by an encoder and transmitted with the data bits, wherein the parity bits are generated in accordance with a parity scheme that ensures that at least one binary transition occurs within each set of n consecutively transmitted bits, wherein n is a specified number. A parity bit syndrome is generated from the code word, and data correction or detection is performed on the code word in accordance with the parity bit syndrome.

BRIEF DESCRIPTION OF THE DRAWINGS

These and other features, aspects, and advantages of the present invention will become more fully apparent from the following description, appended claims, and accompanying drawings in which:

FIG. 2 shows the serialized bit arrangement of the subwords of the 12-bit case of an embodiment of the present invention;

FIG. 3 shows the serialized bit arrangement of the subwords of the 10-bit case of an embodiment of the present invention;

FIG. 6 is a parity matrix structure diagram in accordance with the 10-bit case of FIG. 3;

FIG. 7 is a parity-check matrix for single error correction/double error detection in accordance with the 12-bit case of FIG. 2;

FIG. 8 is a parity-check matrix for single error correction/double error detection in accordance with the 10-bit case of FIG. 3.

DESCRIPTION OF THE PREFERRED EMBODIMENT

System Hardware

Figure 1:
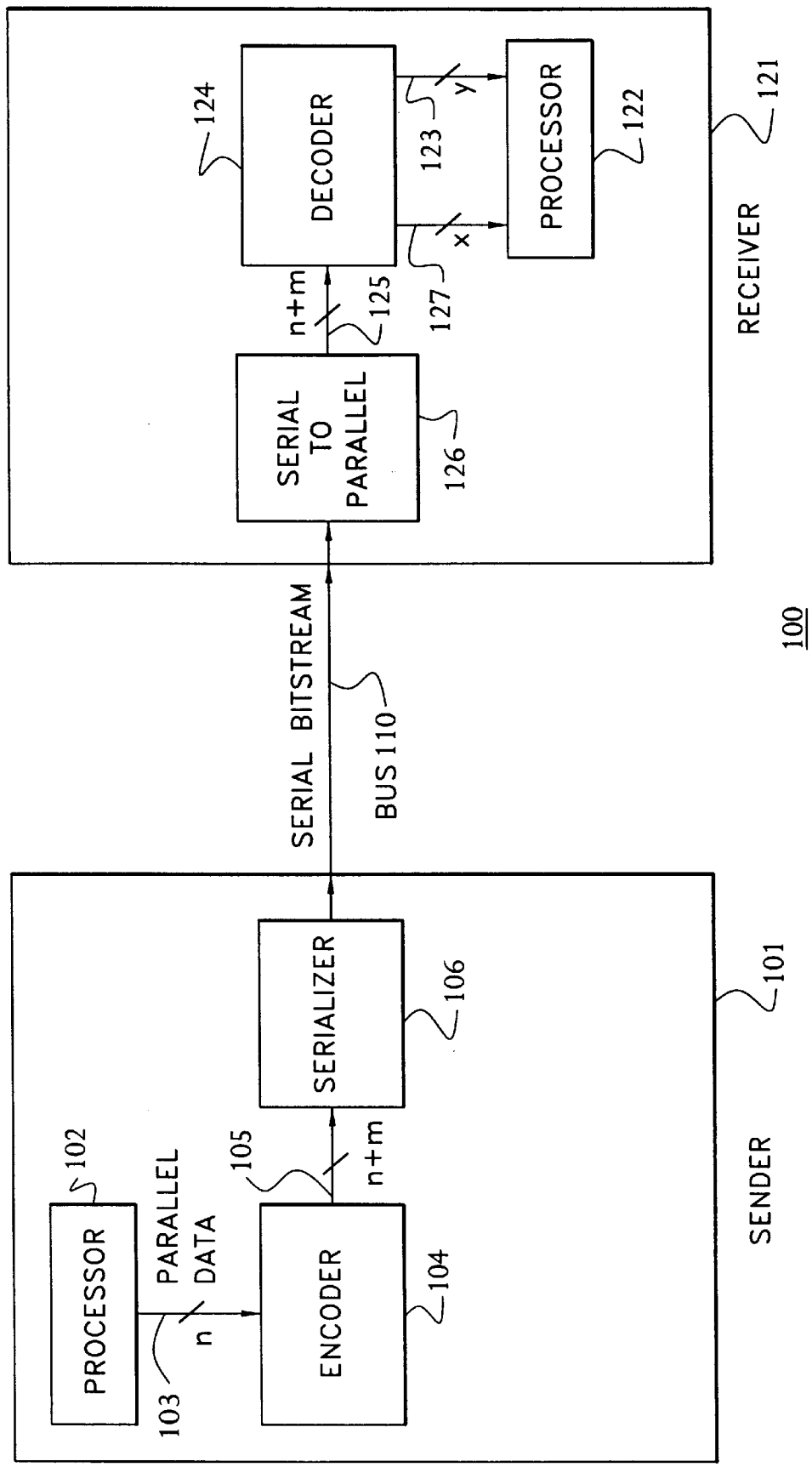
FIG. 1 shows a serial bitstream encoding and decoding system in accordance with an embodiment of the present invention.

As used herein, the term "parity bits" refers to any type of bits that are generated in accordance with an error detection and/or correction scheme and transmitted along with data bits in order to allow a decoder to detect and/or correct errors in the data transmission. Referring now to FIG. 1, there is shown serial bitstream encoding and decoding system 100, in accordance with an embodiment of the present invention. As illustrated, system 100 comprises a sender 101 and a receiver 121, interconnected by a serial communications medium such as bus 110. A serial bitstream is transmitted over bus 110 from sender 101 to receiver 121. As will be understood by those skilled in the art, other communications media may alternatively be utilized to transmit serial data, such as an Integrated Services Digital Network ("ISDN"), local area networks ("LANs"), plain-old telephone lines ("POTS", sometimes referred to as public switched telephone networks ("PSTN")), in addition to various other communications media.

Sender 101 comprises, in one embodiment, a processor 102 or other source of data to be encoded and transmitted serially. This data typically is provided in bytes of certain sizes in parallel by the data source. This data may represent various types of information, such as ASCII text data, pixel data for video images, and the like. Additionally, some of the bits of the data bytes to be transmitted serially may represent normal data and other bits may be used for control signals or other purposes. As illustrated, the data may be supplied over line 103 in n-bit words in parallel, to encoder 104.

Encoder 104 is utilized to encode the data to add extra parity bits so that receiver 121 can perform error detection and/or correction. In one embodiment, Hamming coding, which is well known to those skilled in the art, is utilized to provide for single error correcting-double error detecting ("SEC-DED") at the receiver 121 end. SEC-DED correction means that if a single error occurs between transmission and receipt of the data (i.e., one bit of a given word or subword of data is corrupted so that its state is reversed from 0 to 1 or vice-versa), it may be automatically corrected by decoder 124; and that if two bits are corrupted, decoder 124 can detect this and know that two bits have been corrupted, although correction will not be possible since it is not known which two bits were corrupted.

Thus, encoder 104 typically receives n-bit bytes and adds m parity bits to produce an output byte or subword of n+m bits. This is received by serializer 106 via line 105, which transmits these bits serially over bus 110 at a given clock frequency. Parallelizer 126 of receiver 121 is a serial to parallel device that receives the serial bitstream and, if enough AC transitions are present in the bitstream, parallelizer 126 is able to reproduce the clock frequency at which the bitstream is being serialized by serializer 106. Thus, parallelizer 126 samples the signal present on bus 110 in accordance with the embedded clock signal and provides the n+m bits to decoder 124 via line 125, although these bits may or may not have been corrupted by this point. Decoder 124 thus receives the data and parity bits (possibly corrupted), and is then able to provide the transmitted data to a data sink such as processor 122, making corrections or detecting errors, in accordance with the data and parity bits received.

Hamming Coding

As will be appreciated, Hamming coding may be utilized to perform SEC coding for serially-transmitted data. If n-bit data+m-bit parity check bits form a code word, then n+m must be $\leq 2^m-1$ for the m parity check bits to be able correct all single-bit errors. To do this, a Hamming code is constructed in which the parity checks are independent calculations, in the sense of being linearly independent bit vectors. Each bit position of the code word (including both data and parity bits) maps to a unique parity check bit combination. If there are less than $2^m-1$ total bits in a code word and m parity bits, then some parity bit patterns are redundant, but each bit position can be mapped to a unique parity number. These patterns are referred to as the "syndrome," and upon decoding, a syndrome is generated. If the syndrome is 0, this indicates that there were no single-bit errors. If the syndrome is nonzero, then the pattern is mapped to the bit position which was corrupted (if there was a single-bit error), and the decoder is able to correct the error by inverting the state of the corrupted bit position.

Once a parity syndrome mapping is selected, it can be determined how to generate the parity bits to transmit with the data bits, by taking the exclusive-or (XOR) of each parity bit with the data bit in the bit position for which the parity bit has a 1. For example, consider the following 7-bit code word, containing 4 data bits and 3 parity bits (3 parity bits being sufficient to SEC encode a 7-bit code word):

| Bit position: | 7 | 6 | 5 | 4 | 3 | 2 | 1 |
|---|---|---|---|---|---|---|---|
| Bits: | $P_2$ | $P_1$ | $P_0$ | $D_3$ | $D_2$ | $D_1$ | $D_0$ | where $P_i$ is the ith parity bit and $D_i$ is the ith data bit. In a Hamming code scheme, there may be only one "1" in the row for the bit position that will be occupied by a parity bit, in this example bit positions 5–7, which map to parity bits $P_0-P_2$, as illustrated above.

The following mapping may be utilized:

| Bit position | $P_2$ | $P_1$ | $P_0$ |
|---|---|---|---|
| 1 | 1 | 0 | 1 |
| 2 | 1 | 1 | 0 |
| 3 | 0 | 1 | 1 |
| 4 | 1 | 1 | 1 |
| 5 | 0 | 0 | 1 |
| 6 | 0 | 1 | 0 |
| 7 | 1 | 0 | 0 |

Given this mapping, to generate the $P_0$ bit, for example, the data bits in bit positions 1, 3, and 4 (i.e., $D_0$, $D_2$, and $D_3$) are XOR'd, since there are 1's in the $P_0$ column in the above mapping at data bit positions 1, 3, and 4. At the decoder stage, to generate the syndrome to detect errors, $P_0$ of the syndrome is generated by XOR'ing $D_0$, $D_2$, $D_3$, and $P_0$ (since there is also a 1 in the $P_0$ mapping column for bit position 5, which corresponds to parity bit $P_0$). Thus, in this example, for generating $P_0$ for encoding, $P_0=XOR(D_0, D_2, D_3)$; and, when generating the syndrome for error checking/correcting, $P_0=XOR(D_0, D_2, D_3, P_0)$. These XOR equations may be considered as the equations that characterize each particular parity bit. As will be understood, the parity bits themselves are always assumed to be zero when encoding but are used in calculating the syndrome since the parity bits are also subject to corruption, and the entire code word (both data and parity bits) needs protection. As will be understood, this procedure will work with any mapping of parity bit combinations to bit positions, as long as each bit position corresponds to a unique parity bit combination. As explained above, if the syndrome generated by the decoder is 000, then there was no single bit corruption. If, for example, 001 is generated in the syndrome (i.e., in the syndrome, $P_0=1$, $P_1=0$, $P_2=0$), this uniquely decodes to bit position 5, the value of which may be inverted to correct the corrupted bit.

If m parity bits are utilized but less than $2^m-1$ bits constitute the code word, then there is redundancy in the parity bit mapping; i.e., there are more parity bit combinations than there are bit positions in the code word. If there is enough redundancy, then, in addition to SEC coding, DED coding may be performed. For example, consider the following case:

| Bit position: | 7 | 6 | 5 | 4 | 3 | 2 | 1 |
|---|---|---|---|---|---|---|---|
| Bits: | $P_3$ | $P_2$ | $P_1$ | $P_0$ | $D_2$ | $D_1$ | $D_0$ |

To perform DED coding, we may select only parity bit combination having an odd number of 1's. The following mapping may be utilized:

| Bit position | $P_3$ | $P_2$ | $P_1$ | $P_0$ |
|---|---|---|---|---|
| 1 | 0 | 1 | 1 | 1 |
| 2 | 1 | 1 | 0 | 1 |
| 3 | 1 | 0 | 1 | 1 |
| 4 | 0 | 0 | 0 | 1 |
| 5 | 0 | 0 | 1 | 0 |
| 6 | 0 | 1 | 0 | 0 |
| 7 | 1 | 0 | 0 | 0 |

If the code word 0000000 is transmitted but the first bit is corrupted so that the word received by the receiver is 0000001, the syndrome generated will be $P_3=0$, $P_2=1$, $P_1=1$, $P_0=1$, which is a (permissible) syndrome having an odd number of 1s, which maps to the first bit, which may be inverted to correct the single bit error. If the code word 0000000 is transmitted but the first and sixth bits are corrupted so that the word received by the receiver is 0100001, the syndrome generated will have an even number of 1s, or even parity. Even parity for the syndrome indicates that a double bit error occurred.

AC Transition Encoding

In the present invention, data is transmitted in words comprised of subwords. In one embodiment, words comprise 48 total bits, in the form of 4 subwords each having 12 bits (the "12-bit case"). In another embodiment, words comprise 50 total bits, in the form of 5 subwords each comprising 10 bits (the "10-bit case"). It will be appreciated, however, that other word sizes and subword sizes may also be utilized in accordance with the present invention. In the present invention, a given number of the word's bits are used as parity bits to provide for SEC-DED coding. These parity bits are distributed throughout the subwords of the code word to be serially transmitted and their mapping is selected such that the parity bits themselves provide the necessary AC transitions to ensure that the clock signal is embedded in the serial bitstream.

12-Bit Case

For example, in the 12-bit case, the word comprises 48 total bits, including 8 parity bits and 40 data bits. The 8 parity bits are sufficient to provide SEC-DED coding for 48 total bits with a scheme such as Hamming coding. As will be appreciated, the 40 data bits may comprise any type of data to be transmitted, such as normal data bits plus control bits, and the like. The four serialized subwords are organized with 2 parity bits and 10 data bits, as illustrated in FIG. 2. The parity matrix which maps parity bit patterns to bit positions 1 to 48 is designed so that SEC-DED analysis is possible and also to ensure that the 2 parity bits in each subword provide needed AC transitions in the worst case. Such an AC transition occurring between two consecutively transmitted parity bits in the bitstream may be defined as a "parity-pair transition." In one embodiment, as long as an AC transition occurs anywhere within the 10 data bits of a subword, this is sufficient to allow the decoder to detect the clock signal. Only when all 10 of the data bits of a code word are 0s or 1s is there a need to have the 2 parity bits in the subword provide the needed AC transition. Thus, a parity matrix mapping is selected such that, whenever the data bits in the subword of a pair of parity bits are all 0s or all 1s, the parity bits are necessarily the same as one another. Then, one of the bits may be routinely inverted by the encoder before serial transmission (and routinely uninverted by the receiver) to ensure that an AC transition exists in the subword.

To ensure that a mapping is selected that performs this function but that also allows the parity bits to perform SEC-DED analysis the mapping should satisfy other constraints as well. First, the parity matrix columns are selected so that the parity bit equations for the two parity bits inside each subword are identical for all bit positions not in the subword, and differ for those bit positions inside the subword of the pair of parity bits. Thus, for example, for parity bits $P_0$ and $P_1$, which are a pair of parity bits inside subword 0 (which covers bit positions 0 to 11), $P_0$'s and $P_1$'s column values should be identical for bit positions 12–47, but not for bit positions 0–11.

A similar selection is made for the three other pairs of parity bits, although, as will be appreciated, care should be taken to ensure the uniqueness of each parity bit combination. If one parity bit pattern is selected that is equal to that of another, another mapping should be selected.

As will be understood, this results in the restriction of variation between parity bits of a pair within a subword to being dependent solely on bit patterns inside their own subword. Thus, the variance between the parity bits that will be generated for this pair is localized. Jointly, however, two parity bits of a pair within a given subword still depend upon bit values throughout the entire 48-bit code word.

Another condition that should be satisfied is that $P_0$ and $P_1$ (as well as other parity bit pairs) should have the same number of 1s appearing in their columns. By forcing the same number of 1s in their columns, this ensures that the two parity bits are identical to each other whenever the data bits of the subword comprise all 0s or all 1s. Since this is the worst case and the only case in which it is necessary to have the parity bits provide an AC transition (otherwise AC transitions appear in the data bits themselves if they are not all 0s or 1s), this guarantees that an AC transition will always be provided within each subword. One of the parity bits is always inverted so that whenever the worst case happens, the parity bits are identical, and inverting one of them, e.g., the second one, such as $P_1$, provides a parity-pair transition which guarantees the necessary AC transition. The decoder is aware of this scheme and re-inverts the second parity bit of each pair that it receives. Thus, as will be understood, AC transitions are guaranteed for all possible data sets of the subword's data bits.

10-Bit Case

In the 10-bit case, 9 parity bits are utilized for 41 bits of data. The five serialized subwords are organized with 2 parity bits each and 8 data bits, except for subword 4, which has one parity bit and 9 data bits, as illustrated in FIG. 3. As will be appreciated, for both the 10-bit and 12-bit case, the size of the code word may be extended by adding more subwords, where each subword after the fourth (i.e., subwords 4 and higher) each require only 1 parity bit; the remainder of the bits in these subwords may be data bits. That is, the first four subwords (for SEC-DED coding, with up to 16 bits in a subword) should each contain 2 parity bits, and subsequent subwords need contain only 1 parity bit each. In these single-parity bit subwords, there is an odd number of data bits. Given this condition, it is possible to utilize the single parity bit in the subword to provide its AC transition. For instance, in the 10-bit case illustrated in FIG. 3, parity bits $P_0$ through $P_7$ may be determined as previously explained, and $P_8$ may be simply the negated XOR of the 9 data bits in subword 4. Thus, for all 0s in subword 4, the XOR is 0 (because there are all 0s), and its inversion is 1; and for all 1s in subword 4, the XOR is 1 (because there is an odd number of 1s). In each case the inversion of the parity bit is the opposite of the run of all 0s or 1s in the data bits, thus providing the needed AC transition in the two worst case data sets of subword 4.

Optimization of Hardware Usage

Although there is considerable freedom in selecting the parity matrix mapping that satisfies the above constraints, other criteria may be employed for hardware efficiency or other reasons. As will be appreciated, for every 1 in the matrix, there will be an input to some XOR tree that performs the generation of the parity bits for encoding or the parity syndrome at the decoder stage. Thus, (1) the total number of 1s in the matrix is preferably as small as possible, to minimize the number of XOR trees required in hardware implementations; and (2) the number of 1s in each column preferably varies as little as possible from column to column, since the depth of each parity bit's XOR coding tree grows with the log of the number of terms and it is desirable to have similar logic delays for each parity bit to balance hardware component usage.

Generating Parity Matrices

One method to follow to create a parity matrix in accordance with the above-described constraints is as follows. As will be understood, the following rules are applicable for both the 10- and 12-bit cases discussed above, for the first 8 parity bits. The ninth parity bit for the 10-bit case is a special case which is discussed separately.

Figure 4:
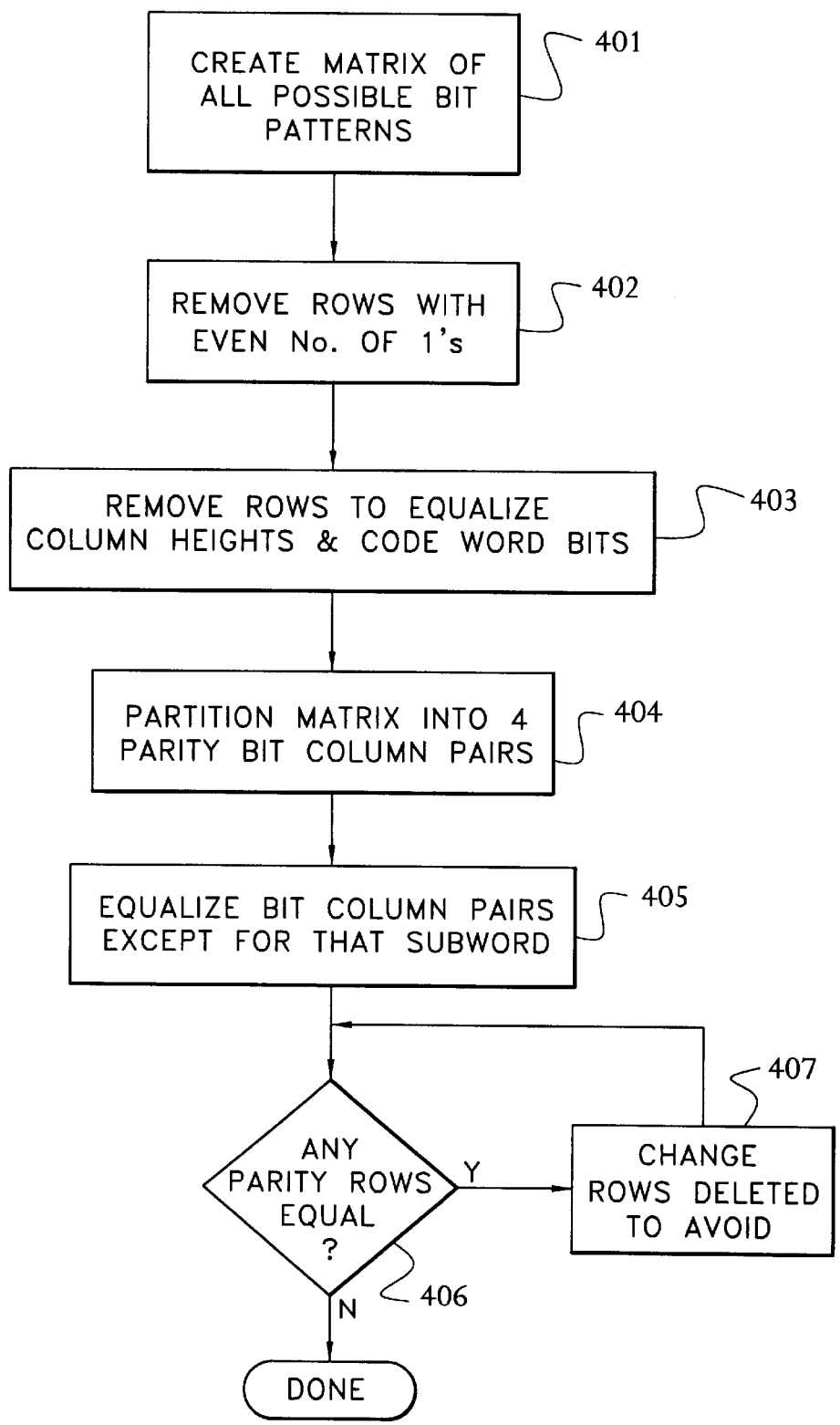
FIG. 4 illustrates a method for constructing the parity matrix for the first eight bits of the 10-bit and 12-bit cases of FIGS. 2 and 3.

Referring now to FIG. 4, there is illustrated a method 400 for constructing the parity matrix for the first eight bits of the 10-bit and 12-bit cases of FIGS. 2 and 3. In method 400, first, a matrix is created of all possible bit patterns for the 8 parity bits (step 401 of FIG. 4). Next, rows having an even number of 1s are removed from the matrix (step 402). Thereafter, enough rows are deleted so that the column heights are equal to the number of bits inside the code word (step 403). In this step, preference is given to removing first the rows with the most 1s appearing, so as to minimize the final number of 1s inside the parity matrix. Secondary preference is given to removing rows that cause the largest variations in the number of 1s in each column. The matrix is then partitioned into four adjacent block columns consisting of two parity bit columns each (step 404). For each of the block columns, the bit columns for the two parity bit columns are made identical, except for rows that correspond to bit positions inside the subword that will have those two parity bits (step 405). Next it is determined whether any parity check is identical to any other check (step 406). If so, the choice of rows that were deleted in step 403 is changed to avoid this match (step 407). If step 406 is successfully performed, a proper parity matrix results.

Figure 5:
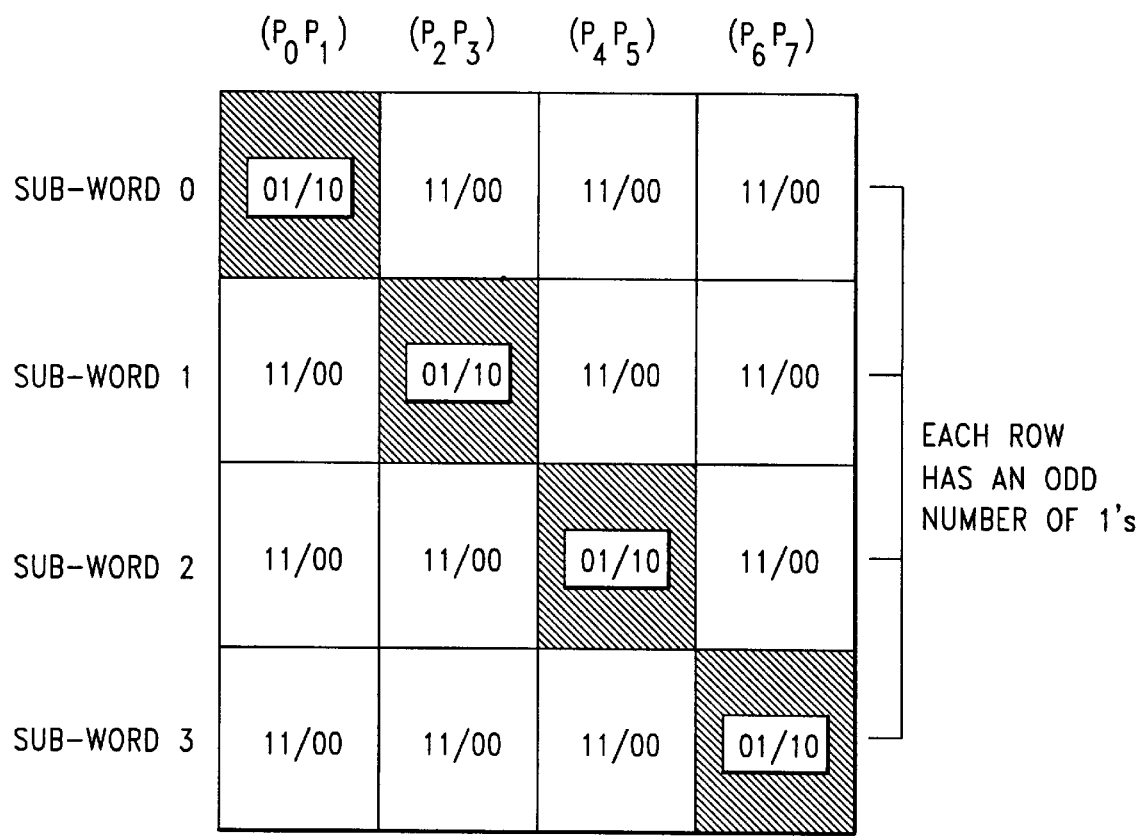
FIG. 5 is a parity matrix structure diagram in accordance with the 12-bit case of FIG. 2.

Referring now to FIG. 5, there is shown a parity matrix structure diagram 500 in accordance with the 12-bit case as illustrated in FIG. 2. Matrix 500 is useful in illustrating the method of designing a parity matrix mapping that satisfies the constraints described above. The 01/10 nomenclature in the gray-shaded regions of matrix 500 indicates that the two adjacent parity bits in a given pair (as indicated by the labels of the columns of matrix 500), should be different, to result in the variance localization discussed previously. Thus, the diagonal blocks or regions should have either values 01 or 10, so that, given the fact that the 11/00 entries always sum to an even number of 1s, each row will have an odd number of 1s. This odd number of 1s is required in order to have DED parity detection as discussed previously. Thus, the net result of these constraints, as will be appreciated, is that each row of the parity matrix is determined by 4 binary decisions made across the row. This encodes for 16 possible row patterns, which is enough to handle either the 10-bit or 12-bit subword cases of FIGS. 2 or 3. Also, it should be ensured in forming the parity matrix that there is an equal number of 01 and 10 values inside each subword block to ensure AC transitions. As will be understood, for the 10- and 12-bit cases, since there are an even number of bits this is possible to arrange.

One method for constructing a matrix in accordance with the above-described characteristics is to generate the matrix rows for the bit positions in the first subword, and then generate remaining rows for the remaining subword bit positions by cyclic rotation to the right of the block entries, as will be discussed further with reference to FIGS. 7 and 8.

Referring now to FIG. 6, there is shown a parity matrix structure diagram 600 in accordance with the 10-bit case as illustrated in FIG. 3. Parity matrix 600 is similar to parity matrix 500, except there is an extra bit, $P_8$, and a different method is used to generate the matrix rows for bits positions of the last subword (subword 4). As can be seen, each row has an odd number of 1s, as described hereinabove. The 0 or 1 regions in the $P_8$ column indicate all 0s or all 1s in the respective block, to meet the requirement that each row have an odd number of 1s. Again, as in the 12-bit case, under these conditions each row of the parity matrix is determined by 4 binary decisions made across the row. This encodes for 16 possible row patterns, which is enough to handle the 10-bit subword case. The simplest way to construct the matrix is to generate the matrix rows for subword 0's bit positions, and then generate the next three block rows by cyclic rotation to the right of the block entries. The final block row (for subword 4) is similar in construction to the other portions of the matrix.

Referring now to FIGS. 7 and 8, there are shown parity-check matrices 700 and 800 for single error correction/double error detection in accordance with the 12-bit case of FIG. 2 and the 10-bit case of FIG. 3, respectively. As will be understood, matrices 700 and 800 represent optimal parity-check matrices developed following the above-described procedures and constraints. Matrices 700 and 800 are divided into four and five submatrices, respectively, corresponding to the four and five subwords for the 12- and 10-bit cases. The column of numbers to the left of each submatrix represents the bit position in the codeword that is represented by the parity syndrome formed by that row of the submatrix. Thus, for example, in matrix 700, the upper left submatrix 701 corresponds to the parity check syndromes for bit positions 0–11. When using Hamming coding, as described above, to generate the actual $P_0$ parity bit which is serially transmitted along with the 40 data bits in the 12-bit example, an XOR is taken of the data bits corresponding to the bit positions for which $P_0$ is 1, to-wit: bit positions 2, 4, 6, 8, 10, 20–23, 28–31, 38–39, 42–43, and 46–47. Bit position 0 also corresponds to a 1 but is a bit position used by a parity bit—namely, $P_0$—and thus is not used to calculate the parity bit $P_0$ but only when computing the syndrome parity bit $P_0$ at the decoder 124 stage. Thus, as will be appreciated, when decoder 124 generates the syndrome to calculate $P_0$ for the syndrome, it takes the XOR of these same received data bits as well as the bit at bit position 0. If no single-bit or double-bit errors occur, then the syndrome should be 0, which is thus indicative of this fact. If a single-bit error occurs, the syndrome generated by decoder 124 is the syndrome check parity bit combination shown in matrix 700 that corresponds to the bit position. This may be used to invert the corrupt bit and thus correct the error.

If a double bit-error occurs then the number of 1s in the syndrome will be even, indicating the presence of a double-bit error. As will be appreciated, if a double-bit error occurs, then the syndrome will be the XOR of the two syndromes that would correlate to each of the two bit errors if they were single bit errors. Although it is not possible to determine which two bits were corrupted when such a syndrome is received, the syndrome will contain an even number of 1s, which is indicative of a double-bit error. As will be understood, such a syndrome will contain either 0 or 2 parity-bit pair transitions, depending upon whether the two corrupt bits are within different submatrices or the same submatrix, respectively. Thus, if bits 6 and 10 are corrupted, then the syndrome will be the XOR of the syndromes at rows 6 and 10 of submatrix 701 of syndrome matrix 700, which will contain an even number of 1s. Because both of these bit positions are represented by the same submatrix, there will be 0 parity-bit pair transitions. Those skilled in the art will appreciate that the syndrome for a given double-bit error may not be unique, since other double-bit errors with other bit-position pairs may also generate the same syndrome.

Thus, double-bit errors are detectable but not correctable under such schemes.

Sideband Signaling

An additional advantage may be obtained by transmitting additional information along with the codeword by carefully selecting the parity matrix structure, to exploit redundancy in the usage of generated parity bits for SEC/DED analysis and for providing for AC transitions. Referring once more to parity matrix 700 of FIG. 7 (for the 12-bit subword case), for any row of the parity matrix, there is only one pair of parity bits that have a parity-pair transition (i.e., one is a 0 and one is a 1). The other pairs are either 00 or 11 and thus contain no transition (before the bit inversion of every other parity bit which is performed before actual serial transmission of the codeword, and which is therefore ignored for purposes of this analysis). Thus, whenever there is a single-bit error, there is exactly one parity-pair transition in the syndrome.

When there are no errors (i.e., no single- or double-bit errors), the syndrome will comprise all 0s. Thus, there will be an even number (zero) of 1s, and also no parity-pair transitions.

Whenever there is a double-bit error, there are either two or zero parity-pair transitions, depending upon whether the two corrupted bits correspond to syndromes in different submatrices or in the same submatrix of the parity matrix 700, respectively, as described hereinabove.

There are more parity bit combinations than there are bit positions to represent in the parity scheme. It is possible to exploit such redundancy in appropriate parity schemes to encode an extra bit of information along with the codeword. This extra information will be referred to herein as "sideband signaling."

In one embodiment, the parity bits generated by the encoder are XOR'd with the alternating "transition" pattern 01010101 prior to transmission. When the parity bits are XOR'd in this manner, this is referred to herein as "asserting the sideband signal." Whenever the parity bits are transmitted without such sideband XOR'ing, the sideband signal is not asserted. If decoder 124 is able to correct for single-bit errors and detect double-bit errors whether or not the sideband signal is asserted, and if decoder 124 is in defined cases able to detect whether or not the sideband signal is asserted, then sideband signal information may be carried by the parity bits in this manner. Also, one goal of such a sideband signal scheme is to maintain the AC transition guarantee provided by the parity-bit scheme as described hereinabove.

When the sideband signal is asserted and there are no errors, the syndrome, instead of comprising all 0s, will equal the alternating transition pattern 01010101, which comprises 4 parity-pair transitions. As explained above, a single-bit error causes exactly one parity-pair transition in the syndrome when the sideband signal is not asserted. Thus, because the sideband alternating transition pattern reverses all transitions, when a single-bit error occurs for a codeword for which the sideband signal has been asserted on the codeword's parity bits, there will be exactly 3 parity-pair transitions.

As explained above, for a double-bit error when the sideband signal is not asserted, there are either 0 or 2 parity-pair transitions in the syndrome computed by decoder 124. Thus, there will be either 2 or 4 parity-pair transitions in the syndrome when a double-bit error occurs for a codeword for which the sideband signal has been asserted. The 4-transition case may be distinguished by decoder 124 from the transitions that also occur in the no-error case (with sideband), since when there is no error the syndrome will be 01010101, whereas the syndrome will have some other pattern when there is a double-bit error. However, there are 2 transitions in two cases: when a double-bit error occurs for bit positions in different parity matrix subwords, whether or not the sideband signal is asserted. Thus, when there are 2 parity-pair transitions in the syndrome, decoder 124 knows that there was a double-bit error but is unable to determine whether the sideband signal was asserted or not.

These characteristics are summarized in Table 1 below:

TABLE 1

| Parity-pair Transitions in Recovered Syndrome | Possible Cause of Syndrome: Error | Possible Cause of Syndrome: Sideband | Method for Full Resolution |
| --- | --- | --- | --- |
| 0 | None | Inactive | All-zero syndrome indicates no error; Non-zero syndrome with even parity indicates double error |
|  | Double | Inactive |  |
| 1 | Single | Inactive | Syndrome determines the faulty bit |
| 2 | Double | Inactive | Double-error indicated; unable to determine whether sideband signal asserted |
|  | Double | Active |  |
| 3 | Single | Active | XOR recovered syndrome with 01010101 to determine faulty bit |
| 4 | None | Active | Syndrome 01010101 indicates no error; otherwise double error indicated |
|  | Double | Active |  |

Figure 9:
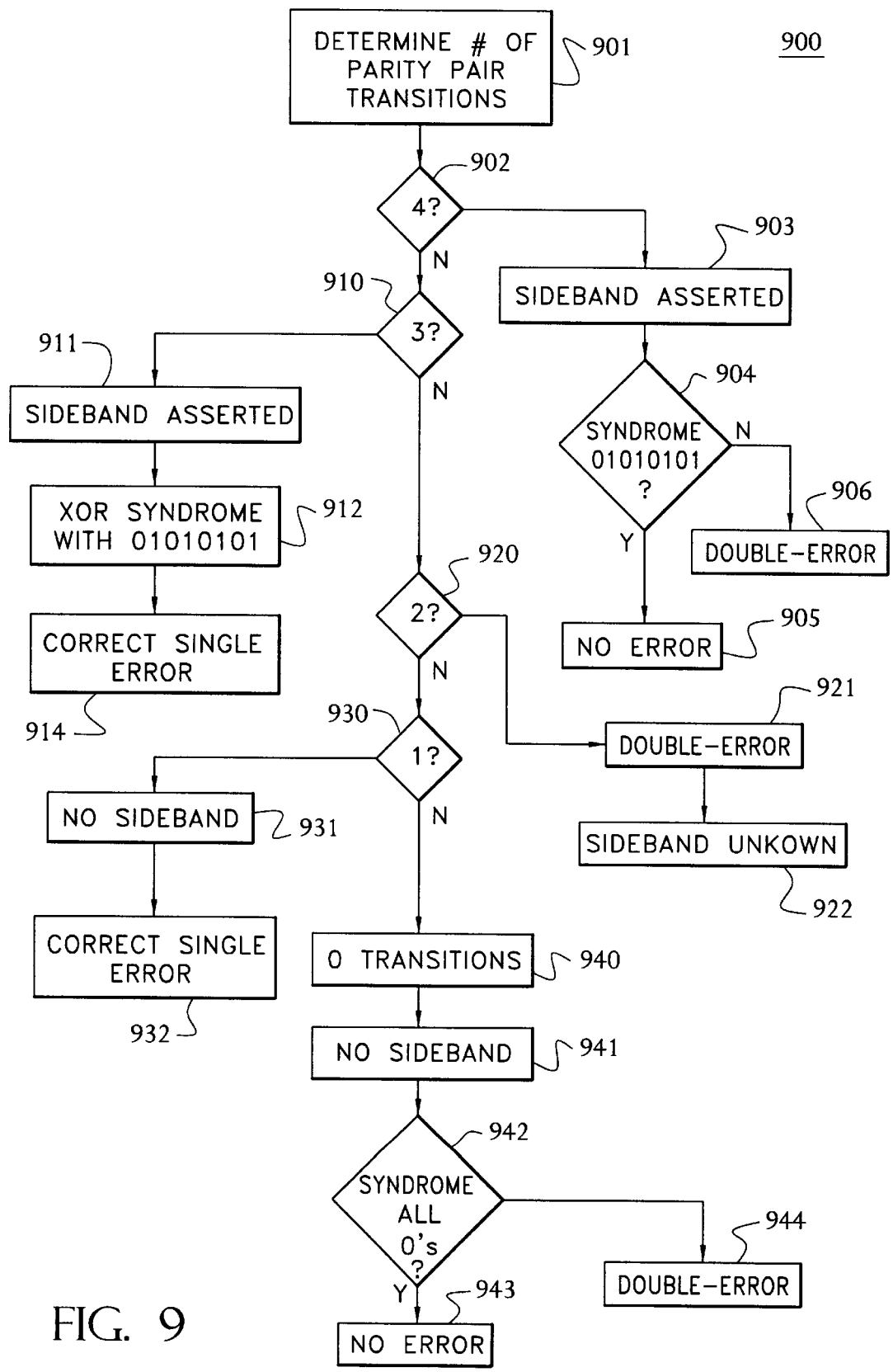
FIG. 9 illustrates a method for detecting a sideband signal, in accordance with an embodiment of the present invention.

As will be appreciated, the above-described rules may be implemented by decoder 124. Referring now to FIG. 9, there is illustrated a method 900 for detecting a sideband signal, in accordance with an embodiment of the present invention. First, decoder 124 determines the number of parity-pair transitions in the recovered syndrome for a received codeword (step 901 of FIG. 9). If there are 4 transitions, then it is known that a sideband signal is present (i.e., was asserted) (steps 902, 903). If the syndrome in this case is 01010101 (step 904), then there is no error (step 905); otherwise, there is a double-error (step 906). It is also known that this double-bit error was caused due to errors in two bits corresponding to the same submatrix within the relevant parity syndrome matrix.

If there are 3 parity-pair transitions in the recovered syndrome, then it is known that a sideband signal is present (steps 910, 911). The syndrome may be XOR'd with the alternating transition pattern used to assert the sideband signal originally, in order to reverse the sideband XOR'ing so that the syndrome can be used in accordance with matrix 700 to determine which bit position was corrupted (steps 912, 913).

If there are 2 parity-pair transitions in the recovered syndrome, then it is known that there was a double error but not whether there was a sideband signal asserted or not (steps 920–922). Decoder 124 may take appropriate action based on this information, as will be understood, such as requesting that encoder 104 re-send the corrupted codeword, or tolerating the error. It is also known in this situation that the two-bit errors occurred in positions represented by different submatrices.

If there is 1 parity-pair transition in the recovered syndrome, then it is known by decoder 124 that there was no sideband signal asserted and that there was a single-bit error, which may be corrected by using the syndrome (steps 930–932).

Otherwise, if there are not 4, 3, 2, or 1 transitions, there will be 0 parity-pair transitions in the recovered syndrome, and it is then known that there was no sideband signal asserted (steps 940, 941). If the syndrome itself is all 0s, then there is no error detected (steps 942, 943). Otherwise, there is a double-error detected (steps 942, 944).

Thus, by detecting the number of transitions and being able to distinguish between no-error and double-error situations when there are 0 or 4 transitions, the decoder is able to determine, in defined instances, when the sideband signal is asserted or not, while still performing SEC/DED analysis as before. In the 3-transition case, the syndrome may be XOR'd again with 01010101 to provide the original syndrome to determine which bit position is in error.

In one embodiment, the sideband signal may represent a flag signal that flags the transmitted codeword as "control" data or "normal" data. If the signal is detected in a given codeword by decoder 124, then the data may be considered "control" data. Otherwise the data is considered normal data.

As will also be understood, in the case where a subword's data bits are all 0s or all 1s, the parity pair for that subword may be designed as explained above to provide the necessary AC transition for that subword. Asserting the sideband signal in this situation may interfere with this result. Thus, the "control" data set may be defined to exclude such all-0 or all-1 runs, so that the necessary AC transitions are still guaranteed by the parity scheme. Also, in the case where a double-bit error is detected due to 2 transitions (step 920), it will not be possible for decoder 124 to know whether the sideband signal is present or not. Thus, in this case, decoder 124 may, for example, decide to request that encoder 104 re-transmit the corrupted codeword.

Other usages may also be made of this sideband signal technique, for example to transmit an extra bit along with the data bits, instead of a control bit that indicates the type of data bits transmitted. For example, when decoder 124 detects the sideband encoding signal this may be interpreted as a "1"; when no sideband encoding signal is detected this may be interpreted as a "0". This sideband bit may represent an extra data bit at the end or beginning of the other data bits in the code word. In this case, if the extra bit of information can be transmitted even when one of the subword's data bits are all 0s or all 1s, then the assertion of the sideband signal may interfere with the synchronization guaranteed by the AC transitions, as explained above. One solution is to never assert the sideband signal whenever it would potentially interfere with the AC transitions supplied by parity pairs within subwords, e.g. whenever the data bits of one of the subwords are all 0s or all 1s. In such a technique, decoder 124 may be configured to realize that, whenever it receives a codeword for which any of its subwords are all 0s or all 1s, encoder 104 will not have asserted a sideband signal, so that decoder 124 will not interpret the lack of a sideband signal in this instance as a sideband bit 0.

Implementation

As will be understood by those skilled in the art, the encoding and decoding of the present invention may be implemented in a variety of ways. In one embodiment, the data to be transmitted serially is loaded, for example by processor 102 of FIG. 1, into a register on a chip such as an application-specific integrated circuit ("ASIC"), having an array of XOR trees that perform the parity check bit calculations to generate the parity bits to accompany the data to be serialized. The ASIC is included in the functions of encoder 104 of FIG. 1. A similar technique and hardware such as an ASIC with an appropriate array of XOR trees may be utilized by the decoder 124 to generate the parity syndrome, to produce correcting bits for single errors, and to check if the syndrome's parity is even (the double error signature). As will be appreciated, decoder 124 may output the entire 40-bit (12-bit case) or 41-bit (10-bit case) code-words which comprise the subwords that are serially transmitted. Thus, line 123 may provide y bits to processor 122, which may be the 40- or 41-bit codeword, corrected for any single bit errors. Alternatively, the data bits of subwords may be output on line 123, one after another. Line 127 comprises x bits of data and may represent information such as no error detected, double error detected, single error detected (and corrected, possibly along with information on which bit position was corrected), or the presence or absence of the "sideband" signal (the extra bit signal).

In an alternative embodiment, general- or special-purpose microprocessors such as processors 102 and 122 may be programmed to perform the encoding and decoding and serializing and parallelizing described hereinabove.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for encoding data, the method comprising the steps of:
    (a) receiving a word of data bits comprising a plurality of subwords;
    (b) generating a plurality of parity bits for serial transmission of the data bits; and
    (c) serially transmitting the word of data bits and the plurality of parity bits, wherein
        each of one or more of the subwords is transmitted with a pair of parity bits of the plurality of parity bits during serial transmission;
        the plurality of parity bits are generated in accordance with a parity syndrome matrix comprising a unique parity syndrome for each bit position of a code word comprising the word of data and the plurality of parity bits; and
        the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword.

2. The method of claim 1, wherein the parity bits provide for at least one of single-error correction and double-error detection.

3. The method of claim 1, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits;

for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$, first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

4. The method of claim 1, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$ first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

5. The method of claim 1, wherein:

the parity syndrome matrix is such that whenever the data bits of the subword are all 0s or all 1s the pair of parity bits for the subword are always identical.

6. An apparatus for encoding data, comprising:

(a) means for receiving a word of data bits comprising a plurality of subwords;

(b) means for generating a plurality of parity bits for serial transmission of the data bits; and (c) means for serially transmitting the word of data bits and the plurality of parity bits, wherein the parity bits are generated and transmitted with the data bits wherein each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword.

7. The apparatus of claim 6, wherein the parity bits provide for at least one of single-error correction and double-error detection.

8. The apparatus of claim 6, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits; and for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$ first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

9. The apparatus of claim 6, wherein means (b) comprises an encoder circuit having an array of XOR trees configured in accordance with a parity syndrome matrix used to generate the parity bits.

10. The apparatus of claim 6, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$ first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

11. The apparatus of claim 6, wherein:

the parity syndrome matrix is such that whenever the data bits of the subword are all 0s or all 1s the pair of parity bits for the subword are always identical.

12. A storage medium encoded with machine-readable computer program code for encoding data, comprising:

(a) means for causing a computer to receive a word of data bits comprising a plurality of subwords;

(b) means for causing the computer to generate a plurality of parity bits for serial transmission of the data bits; and (c) means for causing the computer to serially transmit the word of data bits and the plurality of parity bits, wherein:

each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword.

13. The storage medium of claim 12, wherein the parity bits provide for at least one of single-error correction and double-error detection.

14. The storage medium of claim 12, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits; and for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$, first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

15. The storage medium of claim 12, wherein:

the computer comprises an encoder circuit having an array of XOR trees configured in accordance with a parity syndrome matrix; and means (b) causes the computer to generate the plurality of parity bits with the encoder circuit in accordance with the parity syndrome matrix.

16. The storage medium of claim 12, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$, first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

17. The storage medium of claim 12, wherein:

the parity syndrome matrix is such that whenever the data bits of the subword are all 0s or all 1s the pair of parity bits for the subword are always identical.

18. An apparatus for encoding data, comprising:

(a) an encoder; and (b) a serializer; wherein:

the encoder receives a word of bits comprising a plurality of subwords and generates a plurality of parity bits for serial transmission of the data bits;

the serializer serially transmits the word of data bits and the plurality of parity bits, wherein:

each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword.

19. The apparatus of claim 18, wherein the parity bits provide for at least one of single-error correction and double-error detection.

20. The apparatus of claim 18, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits;

for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0$, $P_1$ first 10 data bits, $P_2$, $P_3$, next 10 data bits, $P_4$, $P_5$, next 10 data bits, $P_6,P_7$, last 10 data bits;

the parity syndrome matrix comprises columns for each parity bit and rows for each bit position of the code word.

21. The apparatus of claim 20, wherein the encoder comprises an encoder circuit having an array of XOR trees configured in accordance with the parity syndrome matrix.

22. The apparatus of claim 18, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$, first 8 data bits, $P_2,P_3$, next 8 data bits, $P_4,P_5$, next 8 data bits, $P_6,P_7$, next 8 data bits, $P_8$, last 9 data bits;

the parity syndrome matrix comprises columns for each parity bit and rows for each bit position of the code word.

23. The apparatus of claim 18, wherein:

the parity syndrome matrix is such that whenever the data bits of the subword are all 0s or all 1s the pair of parity bit for the subword are always identical.

24. A method for decoding data with a decoder, the method comprising the steps of:

(a) receiving a serially-transmitted code word comprising a word of data bits and a plurality of parity bits, wherein the word of data bits comprises a plurality of subwords;

the parity bits have been generated by an encoder and transmitted with the data bits and each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword;

(b) generating a parity bit syndrome from the code word; and (c) performing at least one of error detection and error correction on the code word in accordance with the parity bit syndrome.

25. The method of claim 24, wherein:

step (c) is performed by a decoder circuit having an array of XOR trees configured in accordance with the parity syndrome matrix.

26. The method of claim 24, wherein step (a) further comprises the step of converting the serially-transmitted code word to parallel.

27. The method of claim 24, wherein the parity bits provide for at least one of single-error correction and double-error detection.

28. The method of claim 24, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits;

for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$, first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

29. The method of claim 24, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$, first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

30. The method of claim 24, wherein:

the parity syndrome matrix is such that whenever the data bits of the subword are all 0s or all 1s the pair of parity bits for the subword are always identical.

31. An apparatus for decoding data, comprising:

(a) means for receiving a serially-transmitted code word comprising a word of data bits and a plurality of parity bits, wherein:

the word of data bits comprises a plurality of subwords;

the parity bits have been generated by an encoder and transmitted with the data bits and each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of pairs bits for the subword provide a binary transition for the subword;

(b) means for generating a parity bit syndrome from the code word; and (c) means for performing data correction or detection on the code word in accordance with the parity bit syndrome.

32. The apparatus of claim 31, wherein:

means (c) comprises a decoder circuit having an array of XOR trees configured in accordance with the parity syndrome matrix.

33. The apparatus of claim 31, wherein means (a) further comprises means for converting the serially-transmitted code word to parallel.

34. The apparatus of claim 31, wherein the parity bits provide for at least one of single-error correction and double-error detection.

35. The apparatus of claim 31, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits;

for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$ first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

36. The apparatus of claim 31, wherein:

the word of data bits comprises 41 data bits; p1 the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$ first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

37. The apparatus of claim 31, wherein:

the parity syndrome matrix is such that whenever the data bits of the subword are all 0s or all 1s the pair of parity bits for the subword are always identical.

38. A storage medium encoded with machine-readable computer program code for decoding data, the storage medium comprising:

(a) means for causing a computer to receive a serially-transmitted code word comprising a word of data bits and a plurality of parity bits, wherein:

the word of data bits comprises a plurality of subwords;

the parity bits have been generated by an encoder and transmitted with the data bits and each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword;

(b) means for causing the computer to generate a parity bit syndrome from the code word; and (c) means for causing the computer to perform data correction or detection on the code word in accordance with the parity bit syndrome.

39. The storage medium of claim 38, wherein:

means (c) comprises means for causing the computer to perform data correction or detection with a decoder circuit having an array of XOR trees configured in accordance with the parity syndrome matrix.

40. The storage medium of claim 38, wherein means (a) causes the computer to convert the serially-transmitted code word to parallel.

41. The storage medium of claim 38, wherein the parity bits provide for at least one of single-error correction and double-error detection.

42. The storage medium of claim 38, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits;

for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$, first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

43. The storage medium of claim 38, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$, first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

44. The storage medium of claim 38, wherein:

the parity syndrome matrix is such that whenever the data bits of the subword are all 0s or all 1s the pair of parity bits for the subword are always identical.

45. An apparatus for decoding data, comprising:

(a) a parallelizer; and (b) a decoder; wherein:

the parallelizer receives a serially-transmitted code word comprising a word of data bits and a plurality of parity bits, wherein:

the word of data bits comprises a plurality of subwords;

the parity bits have been generated by an encoder and transmitted with the data bits and each of one or more of the subwords is transmitted with a pair of parity bits of the plurality of parity bits during serial transmission;

the plurality of parity bits are generated in accordance with a parity syndrome matrix comprising a unique parity syndrome for each bit position of a code word comprising the word of data and the plurality of parity bits; and the parity syndrome matrix is such that the pair of parity bits for a subword each vary identically for changes in data bits in the other subwords and differently for changes in data bits in the subword, except that whenever the data bits of the subword are all 0s or all 1s the pair of parity bits for the subword provide a binary transition for the subword; and the decoder generates a parity bit syndrome from the code word and performs data correction or detection on the code word in accordance with the parity bit syndrome.

46. The apparatus of claim 45, wherein:

the decoder comprises an array of XOR trees configured in accordance with the parity syndrome matrix.

47. The apparatus of claim 45, wherein the parallelizer converts the serially-transmitted code word to parallel.

48. The apparatus of claim 45, wherein the parity bits provide for at least one of single-error correction and double-error detection.

49. The apparatus of claim 45, wherein:

Hamming coding is used to generate the parity bits;

the word of data bits comprises 40 data bits;

the plurality of parity bits comprises 8 parity bits;

n equals 12 and the transmission comprises four subwords, each comprising a pair of parity bits and 10 data bits;

for each subword, the pair of parity bits provide for a binary transition when the data bits of the subword comprise either 10 1s or 10 0s;

the plurality of parity bits comprise bits $P_0$–$P_7$;

the word of data bits and the plurality of parity bits constitute a code word arranged as follows: $P_0,P_1$ first 10 data bits, $P_2,P_3$, next 10 data bits, $P_4,P_5$, next 10 data bits, $P_6,P_7$, last 10 data bits; and the parity syndrome matrix comprises columns for each parity bit and rows for each bit position of the code word.

50. The apparatus of claim 45, wherein:

the word of data bits comprises 41 data bits;

the plurality of parity bits comprises 9 parity bits;

n equals 10 and the transmission comprises four subwords, each comprising a pair of parity bits and 8 data bits, and a fifth subword comprising one parity bit and 9 data bits;

for the four subwords, the pair of parity bits provide for a binary transition when the data bits of the subword comprise either 8 1s or 8 0s, and the parity bit of the fifth subword provides for a binary transition when the data bits of the fifth subword comprise either 9 1s or 9 0s;

the plurality of parity bits comprise bits $P_0$–$P_8$;

the word of data bits and the plurality of parity bits constitute a code word arranged as follows: $P_0,P_1$, first 8 data bits, $P_2,P_3$, next 8 data bits, $P_4,P_5$, next 8 data bits, $P_6,P_7$, next 8 data bits, $P_8$, last 9 data bits; and the parity syndrome matrix comprises columns for each parity bit and rows for each bit position of the code word.

51. The apparatus of claim 45, wherein:

the parity syndrome matrix is such that whenever the data bits of the subword are all 0s or all 1s the pair of parity bits for the subword are always identical.

52. A method for encoding data, the method comprising the steps of:

(a) receiving a word of data bits;

(b) generating a plurality of parity bits for serial transmission of the data bits; and (c) serially transmitting the word of data bits and the plurality of parity bits, wherein:

the parity bits are generated and transmitted with the data bits;

the parity bits are generated in accordance with a parity scheme corresponding to a parity syndrome matrix comprising a unique parity syndrome for each bit position of a code word comprising the word of data and the plurality of parity bits, the code word comprising a plurality of subwords comprising data bits and a pair of parity bits, wherein the parity scheme ensures that the parity bits provide at least one binary transition for each subword whenever the data bits of each said subword comprise either all 1s or all 0s; and the parity syndrome matrix is formed by:

(1) creating a matrix of all bit patterns possible with the plurality of parity bits;

(2) removing rows of the matrix having an even number of 1s;

(3) removing rows remaining in the matrix so that column heights are equal to the number of the code word;

(4) partitioning the matrix into parity bit column pairs corresponding to the pairs of parity bits within each subword;

(5) for each subword, equalizing parity bit pairs in each parity bit column except for parity bit pairs within the subword; and (6) changing the removed rows as long as any rows in the matrix are equal to ensure unique parity syndromes.

53. An apparatus for encoding data, comprising:

(a) means for receiving a word of data bits;

(b) means for generating a plurality of parity bits for serial transmission of the data bits; and (c) means for serially transmitting the word of data bits and the plurality of parity bits, wherein:

the parity bits are generated and transmitted with the data bits;

the parity bits are generated in accordance with a parity scheme corresponding to a parity syndrome matrix comprising a unique parity syndrome for each bit position of a code word comprising the word of data and the plurality of parity bits, the code word comprising a plurality of subwords comprising data bits and a pair of parity bits, wherein the parity scheme ensures that the parity bits provide at least one binary transition for each subword whenever the data bits of each said subword comprise either all 1s or all 0s; and the parity syndrome matrix is formed by:

(1) creating a matrix of all bit patterns possible with the plurality of parity bits;

(2) removing rows of the matrix having an even number of 1s;

(3) removing rows remaining in the matrix so that column heights are equal to the number of the code word;

(4) partitioning the matrix into parity bit column pairs corresponding to the pairs of parity bits within each subword;

(5) for each subword, equalizing parity bit pairs in each parity bit column except for parity bit pairs within the subword; and (6) changing the removed rows as long as any rows in the matrix are equal to ensure unique parity syndromes.

54. A method for decoding data with a decoder, the method comprising the steps of:

(a) receiving a serially-transmitted code word comprising a word of data bits and a plurality of parity bits, wherein:

the word of data bits comprises a plurality of subwords; and the plurality parity bits have been generated by an encoder and transmitted with the data bits and each of one or more of the subwords includes a pair of parity bits of the plurality of parity bits and data bits;

(b) generating a parity bit syndrome from the code word; and (c) performing at least one of error detection and error correction on the code word in accordance with the parity bit syndrome, wherein:

the parity bits are generated in accordance with a parity scheme corresponding to a parity syndrome matrix comprising a unique parity syndrome for each bit position of the code word, wherein the parity scheme ensures that the parity bits provide at least one binary transition for each subword whenever the data bits of each said subword comprises either all 1s or all 0s; and the parity syndrome matrix is formed by:

(1) creating a matrix of all bit patterns possible with the plurality of parity bits;

(2) removing rows of the matrix having an even number of 1s;

(3) removing rows remaining in the matrix so that column heights are equal to the number of the code word;

(4) partitioning the matrix into parity bit column pairs corresponding to the pairs of parity bits within each subword;

(5) for each subword, equalizing parity bit pairs in each parity bit column except for parity bit pairs within the subword; and (6) changing the removed rows as long as any rows in the matrix are equal to ensure unique parity syndromes.

55. An apparatus for decoding data, comprising:

(a) means for receiving a serially-transmitted code word comprising a word of data bits and a plurality of parity bits, wherein:

the word of data bits comprises a plurality of subwords; and the plurality parity bits have been generated by an encoder and transmitted with the data bits and each of one or more of the subwords includes a pair of parity bits of the plurality of parity bits and data bits;

(b) means for generating a parity bit syndrome from the code word; and (c) means for performing at least one of error detection and error correction on the code word in accordance with the parity bit syndrome, wherein:

the parity bits are generated in accordance with a parity scheme corresponding to a parity syndrome matrix comprising a unique parity syndrome for each bit position of the code word, wherein the parity scheme ensures that the parity bits provide at least one binary transition for each subword whenever the data bits of each said subword comprises either all 1s or all 0s; and the parity syndrome matrix is formed by:

(1) creating a matrix of all bit patterns possible with the plurality of parity bits;

(2) removing rows of the matrix having an even number of 1s;

(3) removing rows remaining in the matrix so that column heights are equal to the number of the code word;

(4) partitioning the matrix into parity bit column pairs corresponding to the pairs of parity bits within each subword;

(5) for each subword, equalizing parity bit pairs in each parity bit column except for parity bit pairs within the subword; and (6) changing the removed rows as long as any rows in the matrix are equal to ensure unique parity syndromes.

* * * * *